United States Patent
Ückert

(10) Patent No.: US 7,597,626 B2
(45) Date of Patent: Oct. 6, 2009

(54) MEMBRANE COUPLING IN A COMPACT DESIGN

(75) Inventor: Heinrich Ückert, Marl (DE)

(73) Assignee: Hackforth GmbH, Herne (DE)

( * ) Notice: Subject to any disclaimer, the term of this patent is extended or adjusted under 35 U.S.C. 154(b) by 0 days.

(21) Appl. No.: 11/587,279

(22) PCT Filed: Apr. 2, 2005

(86) PCT No.: PCT/EP2005/003479

§ 371 (c)(1),
(2), (4) Date: Oct. 23, 2006

(87) PCT Pub. No.: WO2005/106270

PCT Pub. Date: Nov. 10, 2005

(65) Prior Publication Data

US 2007/0225080 A1    Sep. 27, 2007

(30) Foreign Application Priority Data

Apr. 23, 2004    (DE) ............... 20 2004 006 442 U

(51) Int. Cl.
*F16D 3/00* (2006.01)
(52) U.S. Cl. .......................................... 464/79; 464/99
(58) Field of Classification Search ................ 464/79, 464/93, 94, 95, 99, 137
See application file for complete search history.

(56) References Cited

U.S. PATENT DOCUMENTS

| | | | | |
|---|---|---|---|---|
| 1,283,787 A | * | 11/1918 | Jencick | 464/99 |
| 1,454,087 A | * | 5/1923 | Thomas | 464/99 |
| 1,626,195 A | * | 4/1927 | Hiller | 464/95 |
| 1,639,480 A | * | 8/1927 | Bauman | 464/79 |
| 2,630,692 A | * | 3/1953 | Naugler | 464/69 |
| 3,229,480 A | * | 1/1966 | Seigel et al. | 464/95 |
| 3,422,637 A | * | 1/1969 | Kelley | 464/93 |
| 3,985,000 A | * | 10/1976 | Hartz | 464/99 |
| 4,196,597 A | * | 4/1980 | Robinson | 464/99 |
| 4,385,895 A | * | 5/1983 | Wirth | 464/69 |
| 4,492,583 A | * | 1/1985 | Morrison | 464/99 |
| 4,737,136 A | * | 4/1988 | Federn | 464/99 |
| 4,741,722 A | * | 5/1988 | Federn | 464/99 |
| 4,795,012 A | * | 1/1989 | Durum | 464/99 |
| 5,066,263 A | * | 11/1991 | Lunke et al. | 464/96 |
| 5,176,575 A | * | 1/1993 | McCullough | 464/99 |
| 5,545,090 A | * | 8/1996 | Kirschey | 464/96 |
| 5,700,197 A | * | 12/1997 | Kuribayashi | 464/69 |
| 5,888,140 A | * | 3/1999 | Klingler et al. | 464/99 |
| 6,471,594 B2 | * | 10/2002 | Scheithauer et al. | 464/99 |

FOREIGN PATENT DOCUMENTS

DE    27 41 652 A1    3/1979
EP       82797 A2  *  6/1983

* cited by examiner

*Primary Examiner*—Aaron M Dunwoody
(74) *Attorney, Agent, or Firm*—Collard & Roe, P.C.

(57) ABSTRACT

A membrane-type coupling includes an input flange and an output flange which are interconnected via membrane packs in order to transmit torque in such a way that an input membrane pack is braced to the input flange, two output membrane packs that are connected in parallel are braced to the output flange, and the membrane packs are braced to one another with the aid of a clamping set composed of clamping rings. In order to reduce the volume and weight of such a membrane-type coupling, the input membrane pack is disposed between the two output membrane packs.

4 Claims, 2 Drawing Sheets

MEMBRANE COUPLING IN A COMPACT DESIGN

CROSS REFERENCE TO RELATED APPLICATIONS

Applicant claims priority under 35 U.S.C. §119 of German Application No. 20 2004 006 442.1 filed Apr. 23, 2004. Applicant also claims priority under 35 U.S.C. §365 of PCT/EP2005/003479 filed Apr. 2, 2005. The international application under PCT article 21(2) was not published in English.

BACKGROUND OF THE TNVENTION

1. Field of the Invention

The present innovation relates to a membrane coupling having an input flange and having an output flange, which are connected with one another for the purpose of transferring torque, by way of membrane packs, in such a manner that an input membrane pack is braced relative to the input flange, that two output membrane packs that are switched in parallel are braced relative to the output flange, and that the membrane packs are braced relative to one another by means of a bracing set composed of clamping rings.

2. Description of the Related Art

U.S. Pat. No. 4,492,583 A discloses a coupling that is composed of two membrane couplings of the present type, coupled by way of a hollow shaft.

The purpose of such a membrane coupling is the transfer of torque between machine elements that are subject to great variations in alignment, while maintaining a precise angle.

A disadvantage of the previously known membrane coupling is its relatively large construction space. This is due to the fact that the membrane packs, which are switched in series, in other words the input membrane pack and the two output membrane packs that are switched in parallel, are disposed one behind the other in the axial direction, between the flanges. This has the result that the bracing set extends almost completely over the entire axial length of the membrane coupling, and consequently makes up a significant part of the coupling mass.

SUMMARY OF THE INVENTION

It is the task of the present innovation to reconfigure a membrane coupling of the type stated initially, in such a manner that it takes up a more compact construction space and, at the same time, its weight is reduced.

This is achieved in that the input membrane pack is disposed between the two output membrane packs.

A fundamental idea of the present innovation consists of nesting the force flow between the flanges. Accordingly, the input membrane pack is disposed approximately in the plane of symmetry between the coupling halves, and one output membrane pack, in each instance, is disposed between the centrally disposed input membrane pack and a flange. The force flow flows from the input shaft, by way of the input membrane pack, into the bracing set. Here, it divides up between the two output membrane packs, which are switched in parallel, and flows off into the output flange on both sides of the plane of symmetry.

Furthermore, a constellation of the components that is symmetrical to a high degree is achieved by means of the arrangement of the membrane packs according to the innovation. This constellation contributes to increasing the quiet running of the coupling, and to balancing out great offset between the coupling halves.

In a preferred further development of the membrane coupling, the input membrane pack is braced relative to the input flange by way of pin/sleeve arrangements of a first type, the output membrane packs are braced relative to the output flange by way of pin/sleeve arrangements of a second type, the pin/sleeve arrangements of both types are disposed on a common diameter, alternating in the circumference direction, the input membrane pack has break-throughs of a first type, which are disposed on the diameter of the pin/sleeve arrangements, and through which the pin/sleeve arrangements of a second type extend axially, without entering into contact with the input membrane pack when the flanges are aligned, and the output membrane packs have break-throughs of a second type, which are disposed on the diameter of the pin/sleeve arrangements, and through which the pin/sleeve arrangements of a first type extend axially, without entering into contact with the output membrane packs when the flanges are aligned. This attachment technique allows a load transfer that is almost free of bending moment and lateral forces even when there are great alignment errors between the flanges. This advantage is achieved in that the pin/sleeve arrangements of a flange can transfer forces only to the membrane pack, which they have to connect with the coupling half, in each instance, in any case. Since the pin/sleeve arrangements of a first type, for example, do not enter into contact with the output membrane packs, it is assured that the force flow flows into the bracing set completely by way of the input membrane pack. Break-throughs for the pin/sleeve arrangements can be made not just in the membrane packs, but also in the flanges.

It is practical if the break-throughs in the membrane packs are configured as bores whose diameters are greater than the diameters of the pin/sleeve arrangements. The tensions in the region of the break-throughs are reduced by means of these measures, and the durability of the coupling is thereby increased.

Furthermore, the axial thickness of the bracing set can be dimensioned in such a manner that it corresponds to the axial distance between the flanges. The installation length of the membrane coupling is further reduced as the result of this measure. A different dimensioning of the bracing set is also possible.

The radial expanse of the membrane coupling can be reduced, however, in that the bracing set pin diameter, the perforated circle diameter, and the diameter on which the pin/sleeve arrangements are disposed are dimensioned so that the bracing set pin diameter is less than the perforated circle diameter, and the perforated circle diameter is in turn is less than or equal to the diameter on which the pin/sleeve arrangements are disposed.

BRIEF DESCRIPTION OF THE DRAWINGS

The present innovation will now be explained using an exemplary embodiment. For this purpose, the figures show.

DETAILED DESCRIPTION OF PREFERRED EMBODIMENTS

Figure 1:
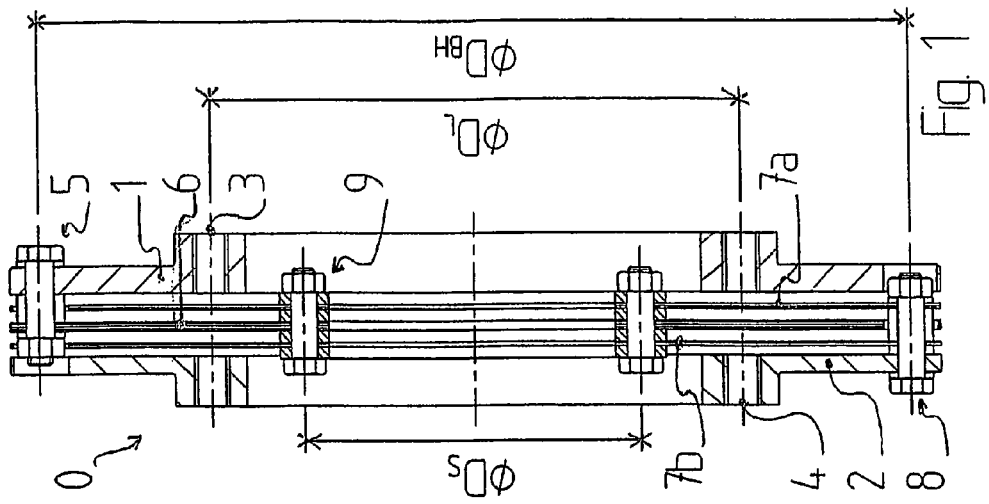
FIG. 1: membrane coupling in longitudinal cross-section.

The membrane coupling, as a whole, is designated with the reference symbol 0. It comprises an input flange 1 and an output flange 2. The flanges 1, 2 are provided with an input perforated circle 3 and an output perforated circle 4, respectively, by way of which the membrane coupling 0 can be coupled to machine elements of a drive train that are disposed ahead of or following it. The two perforated circles 3, 4 are concentric when the flanges are aligned. In the exemplary embodiment, the two perforated circles 3, 4 have the same diameter $D_L$. For certain purposes of use, it is also possible to provide perforated circles 3, 4 with different diameters $D_L$. Pin/sleeve arrangements of a first type 5 are disposed on a greater diameter $D_{BH}$.

A pin/sleeve arrangement of a first type 5 comprises a screw 5a, two sleeves 5b, a nut 5c, and a washer 5d. An input membrane pack 6 is braced relative to the input flange 1 by means of the pin/sleeve arrangement of a first type 5. The input membrane pack 6 consists of a layering of ring-shaped spring washers. The introduction of force into the input membrane pack 6 takes place by way of the sleeves 5b of the pin/sleeve arrangement of a first type 5, in each instance, between which the input membrane pack 6 is braced.

Figure 2:
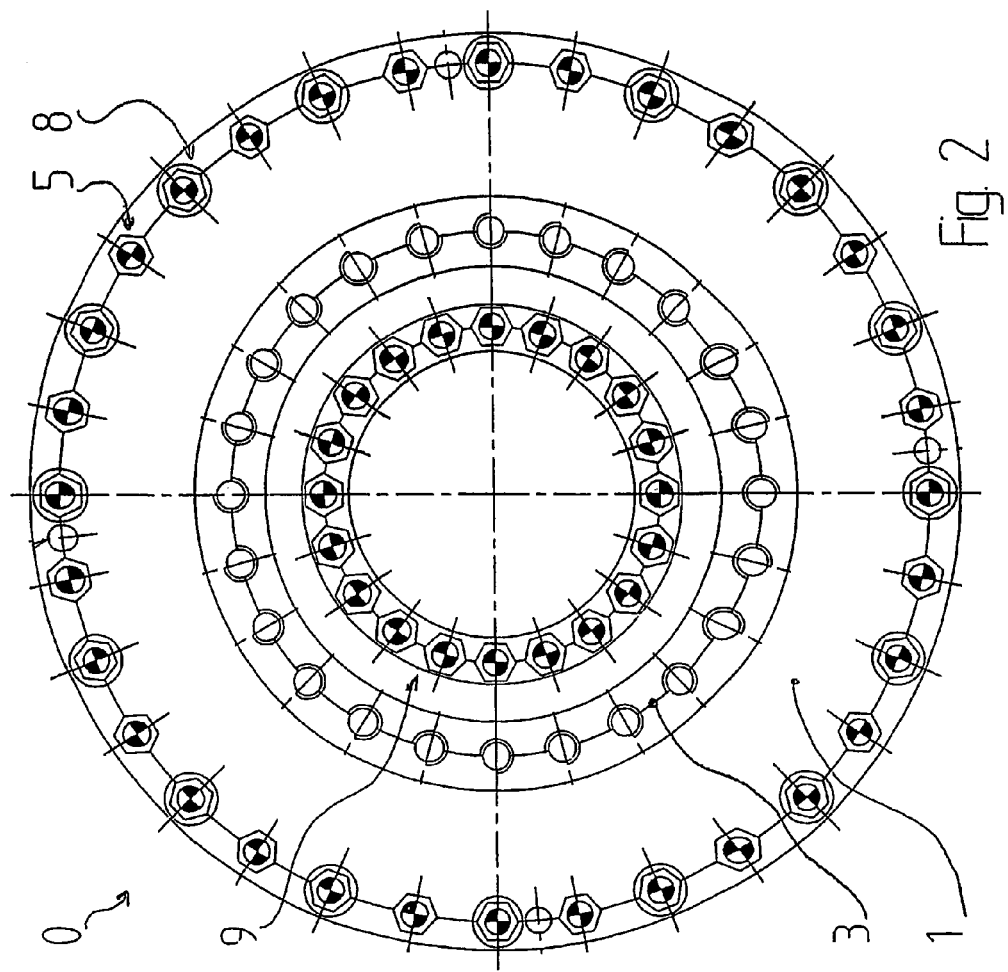
FIG. 2: membrane coupling in a frontal view.
Figure 3:
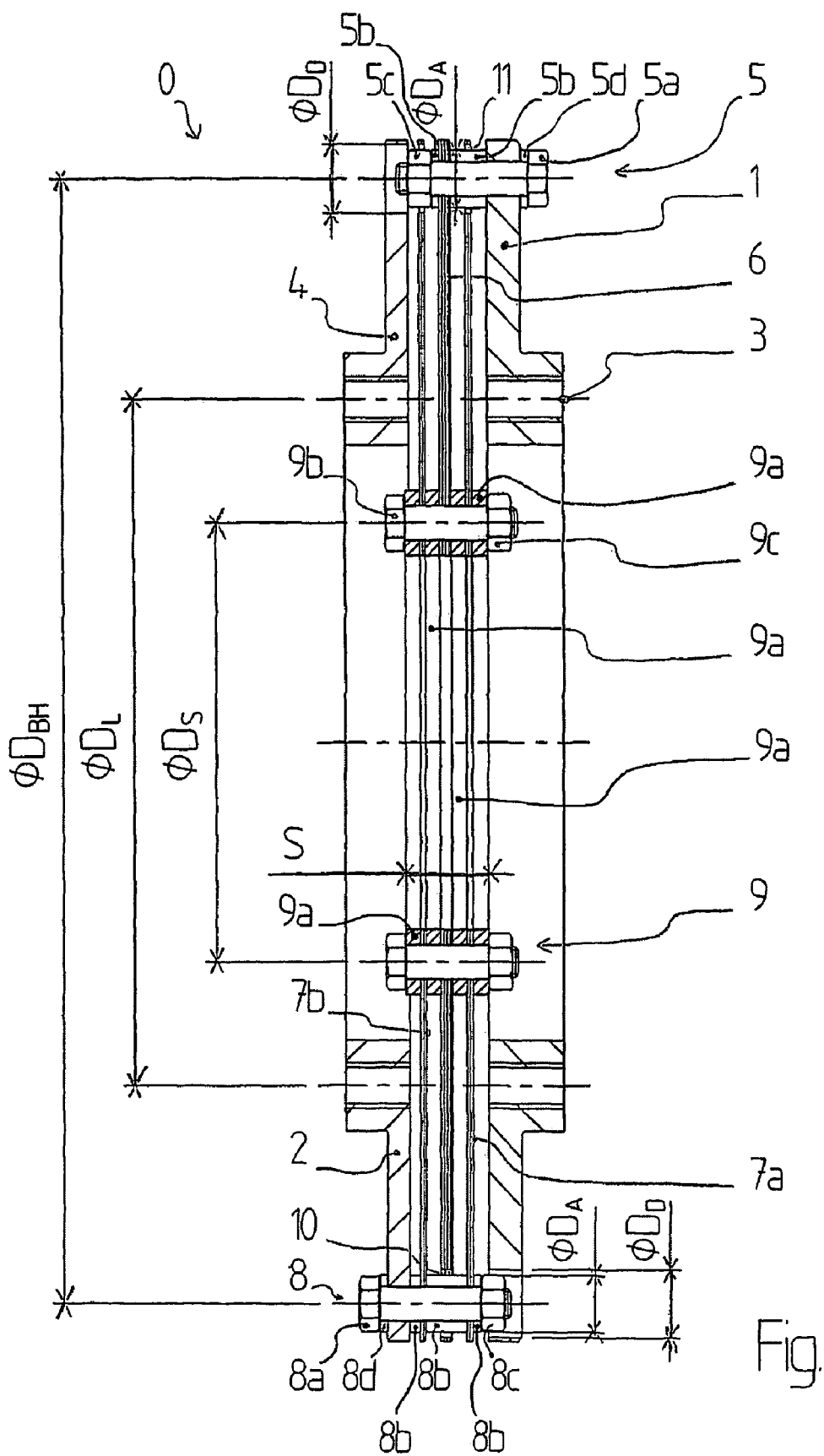
FIG. 3: like FIG. 1, but enlarged.

In similar manner, two output membrane packs 7a, 7b are braced relative to the output flange 2 by way of pin/sleeve arrangements of a second type 8. The pin/sleeve arrangement of a second type 8 comprise a screw 8a, three sleeves 8b, a nut 8c, and a washer 8d. The output membrane packs 7a, 7b are braced between the sleeves 8b of the pin/sleeve arrangement of a second type 8. In this connection, the three sleeves 8b also assume the function of spacers, which position the output membrane packs 7a, 7b in the desired axial orientation within the membrane coupling 0. The pin/sleeve arrangement of a second type 8 are disposed on the same diameter the $D_{BH}$ as the pin/sleeve arrangements of a first type 5. In the circumference direction of the diameter $D_{BH}$, the pin/sleeve arrangements 5, 8 are alternately disposed on the diameter $D_{BH}$; this is particularly evident in FIG. 2.

The membrane packs 6, 7 are braced relative to one another by way of a bracing set 9. The latter comprises a plurality of clamping rings 9a that are placed between the membrane packs 6, 7 and space the latter apart in the axial direction, relative to one another, similar to the sleeves 5b, 8b. The clamping rings 9a are braced against bracing set nuts 9c by way of a plurality of bracing set pins 9b. The bracing set pins 9b are disposed on the bracing set pin diameter $D_S$. For the diameters already mentioned, the following applies: $D_S < D_L \leq D_{BH}$. The axial thickness of the bracing set S corresponds to the axial distance between the flanges 1, 2 in the present exemplary embodiment.

The input membrane pack 6 has circular break-throughs of a first type 10 that are disposed on the diameter $D_{BH}$ coaxial to the pin/sleeve arrangements of a second type 8. The diameter $D_D$ of the break-throughs exceeds the outside diameter $D_A$ of the pin/sleeve arrangement of a second type 8, so that when the flanges are aligned, the pin/sleeve arrangement of a second type 8 extend through the break-throughs of the first type 10, without entering into contact with the input membrane pack 6. Since the diameter of the break-throughs $D_D$ is dimensioned generously as compared with the outside diameters of the sleeves $D_A$, no undesirable transfer of force occurs between the input membrane pack 6 and the pin/sleeve arrangements of a second type 8 even if there is a great deviation in alignment between the coupling halves. In analogous manner, the output membrane packs 7a, 7b are provided with break-throughs of a second type 11, through which the pin/sleeve arrangements of a first type 5 pass without transfer of force.

The invention claimed is:

1. Membrane coupling (0) having an input flange (1) and having an output flange (2), which are connected with one another for the purpose of transferring torque, by way of membrane packs (6, 7a, 7b), in such a manner that an input membrane pack (6) is braced relative to the input flange (1), that two output membrane packs (7a, 7b) that are switched in parallel are braced relative to the output flange (2), and that the membrane packs (6, 7a, 7b) are braced relative to one another by means of a bracing set (9) composed of clamping rings (9a), whereby the input membrane pack (6) is disposed between the two output membrane packs (7a, 7b) wherein a) the input membrane pack (6) is braced relative to the input flange (1) by way of pin/sleeve arrangements of a first type (5), b) that the output membrane packs (7a, 7b) are braced relative to the output flange (2) by way of pin/sleeve arrangements of a second type (8), c) the pin/sleeve arrangements of both types (5, 8) are disposed on a common diameter ($D_{BH}$), alternating in the circumference direction, d) the input membrane pack (6) has break-throughs of a first type (10), which are disposed on the diameter ($D_{BH}$) of the pin/sleeve arrangements (5, 8), and through which the pin/sleeve arrangements of a second type (8) extend axially, without entering into contact with the input membrane pack (6) when the flanges (1, 2) are aligned, e) the output membrane packs (7a, 7b) have break-throughs of a second type (11), which are disposed on the diameter ($D_{BH}$) of the pin/sleeve arrangements (5, 8), and through which the pin/sleeve arrangements of a first type (8) extend axially, without entering into contact with the output membrane packs (7, 8) when the flanges (1, 2) are aligned; and f) the input membrane pack (6) is connected on one side with the input flange (1) and on another side with the bracing set (9).

2. Membrane coupling according to claim 1, wherein the break-throughs of both types (10, 11) are bores whose diameters ($D_D$) are greater than the outside diameters ($D_A$) of the individual pin/sleeve arrangements (5, 8).

3. Membrane coupling according to claim 1, wherein the axial thickness (S) of the bracing set (9) corresponds to the axial distance between the flanges (1, 2).

4. Membrane coupling according to claim 1, wherein a) the bracing set (9) comprises a plurality of bracing set pins (9b) that are disposed on a bracing set pin diameter ($D_S$), b) the flanges (1, 2) have a perforated circle (3, 4), in each instance, by way of which the membrane coupling (0) can be coupled with machine elements that are disposed ahead of or following it, c) and the bracing set pin diameter ($D_S$) is less than the perforated circle diameter ($D_L$) and the perforated circle diameter ($D_L$) in turn is less than or equal to the diameter ($D_{BH}$) on which the pin/sleeve arrangements (5, 8) are disposed.

* * * * *